(12) United States Patent
Dages et al.

(10) Patent No.: US 11,110,758 B1
(45) Date of Patent: Sep. 7, 2021

(54) SYSTEM FOR MONITORING THE INFLATION PRESSURE OF THE TIRES OF AN AIRCRAFT

(71) Applicant: SAFRAN LANDING SYSTEMS, Velizy-Villacoublay (FR)

(72) Inventors: Olivier Dages, Moissy-Cramayel (FR); Joël Zabulon, Moissy-Cramayel (FR)

(73) Assignee: SAFRAN LANDING SYSTEMS, Velizy-Villacoublay (FR)

(*) Notice: Subject to any disclaimer, the term of this patent is extended or adjusted under 35 U.S.C. 154(b) by 0 days.

(21) Appl. No.: 17/073,642

(22) Filed: Oct. 19, 2020

(51) Int. Cl.
*G01M 17/02* (2006.01)
*B60C 23/04* (2006.01)

(52) U.S. Cl.
CPC ...... *B60C 23/0462* (2013.01); *B60C 2200/02* (2013.01)

(58) Field of Classification Search
CPC ............ B60C 23/0408; B60C 23/0472; B60C 23/0433; B60C 23/0466; B60C 23/064
See application file for complete search history.

(56) References Cited

U.S. PATENT DOCUMENTS

| | | | | |
|---|---|---|---|---|
| 4,695,823 A * | 9/1987 | Vernon | ............... | B60C 23/0408 340/447 |
| 6,417,766 B1 * | 7/2002 | Starkey | ............... | B60C 23/0416 340/442 |
| 7,468,655 B2 * | 12/2008 | Logan | ................. | B60C 23/0444 340/442 |
| 2003/0080862 A1 * | 5/2003 | Kranz | ................. | B60C 23/0433 340/442 |
| 2004/0193341 A1 * | 9/2004 | Katou | ................. | B60C 23/0416 701/29.6 |
| 2008/0055060 A1 * | 3/2008 | Logan | ................. | B60C 23/0493 340/447 |
| 2009/0058625 A1 * | 3/2009 | Suzuki | ............... | B60C 23/0433 340/447 |
| 2010/0134269 A1 * | 6/2010 | Zhu | ..................... | B60C 23/0416 340/447 |
| 2010/0141416 A1 * | 6/2010 | Kukshya | ............. | B60C 23/0433 340/447 |
| 2015/0231936 A1 * | 8/2015 | Keller | .................... | B64C 25/36 340/442 |
| 2016/0280018 A1 * | 9/2016 | Kosugi | ............... | B60C 23/0416 |
| 2019/0187027 A1 * | 6/2019 | Lin | ........................ | G01M 17/02 |

FOREIGN PATENT DOCUMENTS

FR 2822755 10/2002

* cited by examiner

*Primary Examiner* — Munear T Akki
(74) *Attorney, Agent, or Firm* — Bookoff McAndrews, PLLC

(57) ABSTRACT

System for monitoring the inflation pressure of the tires of an aircraft comprising a pressure sensor carried by each of the wheel rims of an aircraft and delivering an inflation pressure for each of the tires mounted on these rims, a processing unit ensuring the conversion of the different tire inflation pressures into values that can be used by a display device making these different tire inflation pressures available to a pilot or a maintenance operator, the processing unit being distributed in each of the aircraft wheel covers and configured on the one hand to communicate with the wheel pressure sensor via a short-distance wireless communication link and on the other hand to ensure the transmission of the tire inflation pressure coming from the pressure sensor towards the display device via a medium-range wireless communication link.

10 Claims, 3 Drawing Sheets

[Fig. 1]
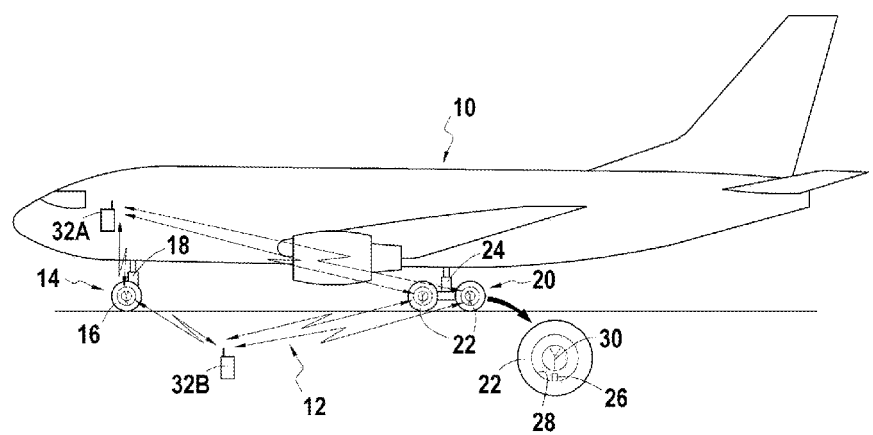

[Fig. 2]
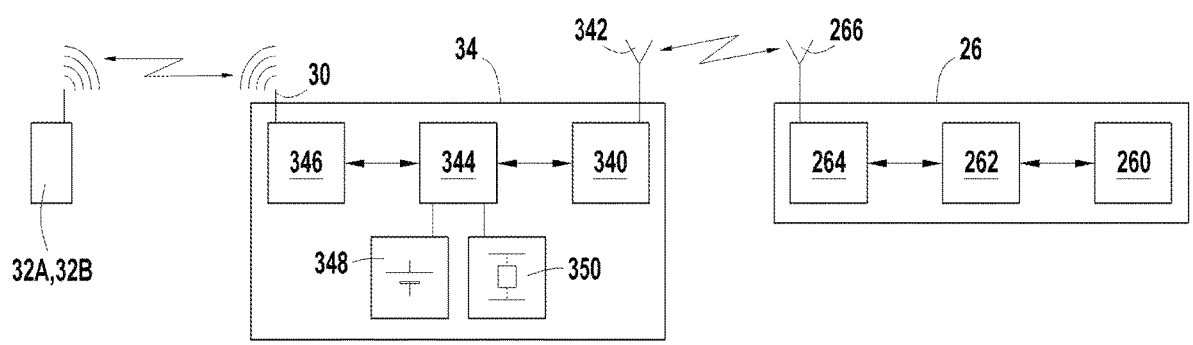

[Fig. 3]
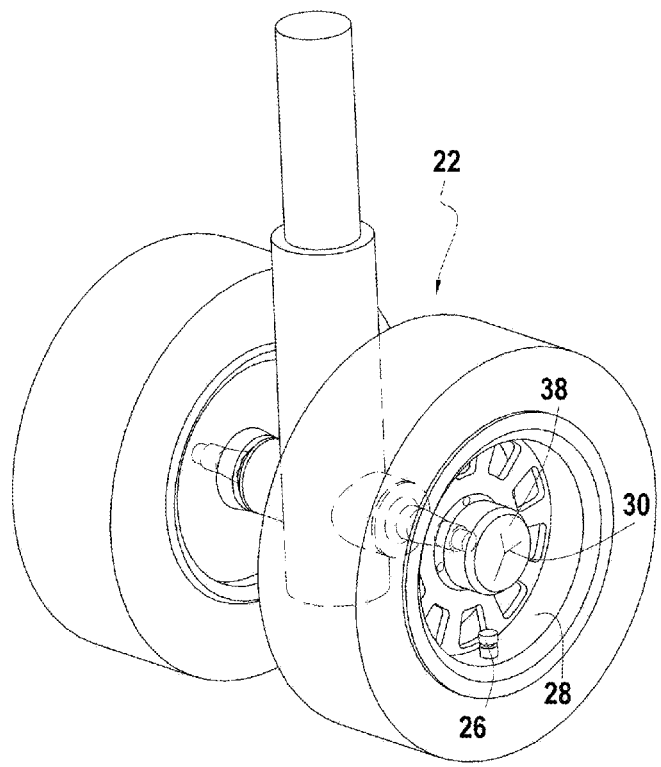
[Fig. 4]
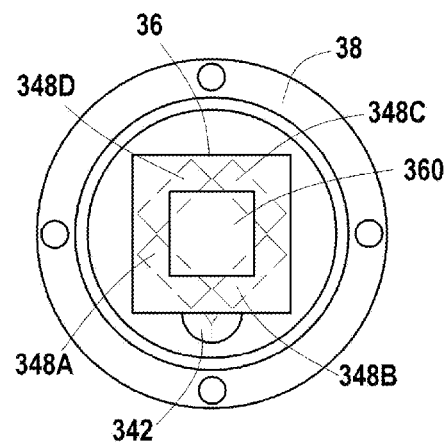

SYSTEM FOR MONITORING THE INFLATION PRESSURE OF THE TIRES OF AN AIRCRAFT

TECHNICAL FIELD

The present invention relates to a method and a system for monitoring the inflation pressure of the tires of an aircraft during different phases of flight or as part of maintenance operations.

PRIOR ART

From the cockpit or during maintenance operations, it is useful to know the pressure of the tires of the different wheels of the landing gear of an aircraft.

For this purpose, it is known to use a sensor for measuring the pressure of the tires of such an aircraft directly installed on the wheel. This sensor, known under the name of TPMS (Tire Pressure Monitoring System), coupled to an on-board data processing system allows the pilots to have a display in the cockpit of the state of pressure of each of the tires during the different flight phases. During the maintenance operations, the operators, by moving around the cockpit, can also check out this display in order to obtain the desired information.

Each TPMS mounted on a rim of the wheel is powered and communicates by means of a cable connecting it to a rotating contact installed in the hub of the wheel. However, this wire connector technology, since it is subjected to a severe environment in terms of shocks and since the cables may for example be torn during human activities around the wheels, during vibration, in particular during retractions/extensions of the landing gear and during temperature changes, is a point of weakness of the system.

A known alternative to this problem has been either to protect the power/communication cable using a mechanical arm or to eliminate the rotating contact through an electromagnetic adaptation. Although these two solutions have each allowed improving the reliability and better guaranteeing the lifetime of the system, they unfortunately came at the cost of an increased space requirement on the wheel.

Also, the applicant has proposed in her patent FR2822755 to eliminate the previous wired architecture and to replace it with a wireless communication system between each of the wheels including a pressure sensor and provided with a rotating antenna and an operating unit remote from the landing gear and provided with a fixed antenna, this operating unit being alone in wired connection with the cockpit.

Although this solution is generally satisfactory, it still suffers from some drawbacks with regard to the current objectives of the aeronautical manufacturers consisting in reducing the fuel consumption of their aircrafts (therefore essentially their masses) and improving their availability, that is to say in particular the downtimes (and installation/uninstallation times) of these aircrafts during the maintenance operations.

DISCLOSURE OF THE INVENTION

The invention therefore proposes to meet these new challenges of reducing the space requirement and optimizing the maintenance times, while ensuring its main mission, namely the provision of reliable information for the pilots as well as for the maintenance operators.

These goals are achieved by a system for monitoring the inflation pressure of the tires of an aircraft comprising:

a pressure sensor carried by each of the wheel rims of the aircraft and delivering an inflation pressure for each of the tires mounted on these rims, an energy autonomous management module including a battery and ensuring the conversion of the different tire inflation pressures into values that can be used by a display device making these different tire inflation pressures available to a pilot or a maintenance operator, characterized in that the energy autonomous management module is distributed in each of the aircraft wheel covers and configured on the one hand to communicate with the wheel pressure sensor via a short-distance wireless communication link and on the other hand to ensure the transmission of the tire inflation pressure coming from the pressure sensor towards the display device via a medium-range wireless communication link, and in that the battery, rechargeable or non-rechargeable, is configured to ensure the power supply to both the energy autonomous management module and the pressure sensor via the short-distance wireless communication link.

Thus, the invention allows reducing or even eliminating the current space requirement of the equipment at the wheel as well as the number of cables. It provides an autonomy solution to the tire inflation pressure monitoring system using batteries placed in the wheel cover, this particular placement further improving the balancing of the wheel by reducing the amount of rotating mass at the pressure sensor. In this way, the autonomy of the pressure sensor can be increased according to the number and power of the on-board batteries without creating a wheel balancing problem.

The system may optionally include an intermediate module on-board the aircraft and through which the transmission of the inflation pressure is relayed to the display device via the medium-range wireless communication link.

The display device can be a portable device or a device integrated into the cockpit of the aircraft and the pressure sensor can also be a pressure and temperature sensor also delivering the temperature of the tire.

Preferably, the pressure sensor includes a transducer for converting the internal pressure of the tire into an electrical signal, a processing unit for associating with this electrical signal a pressure data as well as at least one identifier data of the tire, and a short-distance wireless communication means associated with an antenna for transferring these data to the energy autonomous management module.

Advantageously, the energy autonomous management module further includes a short-distance wireless communication means associated with an antenna for receiving the data coming from the pressure sensor, a processing unit for shaping and if necessary adding one or more surveillance information allowing fault detection, a medium-range wireless communication means associated with an antenna for transferring the set of data thus collected to the display device.

Preferably, the energy autonomous management module is mounted in an equipment compartment integrated under the wheel cover and including an access hatch to allow changing or recharging one or more battery cells.

Advantageously, the processing unit of the energy autonomous management module further includes a clock to ensure a time stamping of the data and is also configured to ensure encryption of these data, preferably via a signature of the AES 128 type.

Advantageously, the short-distance wireless communication takes place on a frequency comprised between 100 kHz and 150 kHz or in an NFC frequency band around 13 MHz and the medium-range wireless communication on the ISM band at 2.4 GHz or the WAIC band between 4.2 and 4.4 GHz according to a communication protocol conforming to the 802.15.4 standard or any other similar protocol.

The invention also relates to an aircraft including a system for monitoring the inflation pressure of the tires of an aircraft as mentioned above.

BRIEF DESCRIPTION OF THE DRAWINGS

FIG. 1 is a schematic view of an aircraft equipped with a pressure monitoring system according to the invention, FIG. 2 schematically illustrates the measurement circuit implemented in the pressure monitoring system according to the invention, FIG. 3 represents in perspective the end portion of a landing gear including two wheels, each integrating part of the pressure monitoring system according to the invention, and FIG. 4 is a view of the interior of the wheel cover illustrating the equipment compartment it contains.

DESCRIPTION OF THE EMBODIMENTS

FIG. 1 represents very schematically an aircraft 10 equipped with a system 12, according to the invention, for monitoring the inflation pressure of each of the wheels of this aircraft.

In the example illustrated, this aircraft is provided on the one hand at the front of a first landing gear element 14 including two wheels 16 mounted on a common axis at the end of a first landing gear strut 18 and on the other hand, substantially in the center of the aircraft, on either side of its longitudinal axis, second and third landing gear elements 20 (only the second one appears in the figure) each including for example four wheels 22 mounted on two common axes parallel to the end of a second landing gear strut 24.

To each tire fitted to a wheel of the aircraft corresponds a pressure sensor 26 carried by the rim 28 of the wheel and an antenna called rotating antenna 30 because it follows the rotation of the wheel, through which at least the pressure information coming from the pressure sensor will be transferred to a display module disposed away from this wheel. This display module which allows the display of the different inflation pressures coming from the different tires is preferably a portable device intended for a pilot 32A or a maintenance operator 32B but it can also be a device secured to the structure of the aircraft and permanently fixed in the cockpit of the aircraft.

As shown in FIG. 2, this pressure sensor 26 which includes a transducer 260 adapted to convert the internal pressure of the tire into an electrical signal and a processing unit 262 to associate with this electrical signal a pressure value as well as at least one identifier of the concerned tire, also includes a short-distance wireless communication means 264 associated with an antenna 266 for the transfer of this pressure and identification information to an energy autonomous management module 34.

This autonomous management module 34 includes for its part a short-distance wireless communication means 340 associated with an antenna 342 for receiving the pressure and identification information coming from the pressure sensor 26, a processing unit 344 for shaping and adding one or more surveillance information (such as the state of the battery, the state of the communication, etc.) allowing the fault detection as well as, preferably, the encryption of this information (via a signature of the AES 128 type for example), a medium-range wireless communication means 346 associated with the antenna 30 for the transfer of the set of information thus collected towards the portable display device 32A, 32B (possibly via an intermediate module, not illustrated, on-board the aircraft and relaying this information via medium-range wireless communication means and a fixed antenna intended to communicate with the rotating antenna), and a battery 348.

This battery, which may be rechargeable or non-rechargeable, ensures, in addition to the power supply to the autonomous management module 34, the power supply to the pressure sensor and its processing unit via the short-distance wireless communication link 264-340 (remote power supply).

Typically, the short-distance wireless communication takes place on a frequency comprised between 100 kHz and 150 kHz or on an NFC (Near Field Communication) type frequency band around 13 MHz and the medium-range communication on the ISM (Industrial, Scientific and Medical) band at 2.4 GHz or the WAIC (Wireless Avionics Intra-Communications) band between 4.2 and 4.4 GHz. The communication protocol will preferably conform to the 802.15.4 standard or any other similar protocol.

The short-distance wireless communication link 264-340 avoids the need for a (mechanical or electromagnetic) rotating contact and for an electrical connecting cable to link the pressure sensor 26 to the management module 34, and also facilitates the replacement of this pressure sensor without the need for disconnection, which improves the reliability of the system. The set of information transferred via this link is advantageously time-stamped by means of a clock 350 to which the processing unit 344 of the module 34 is advantageously connected.

It will be noted that the efficiency of this short-distance wireless communication link scales the energy to be made available to the pressure sensor. This therefore scales the size of the equipment compartment, the lifetime of the battery and therefore the frequency of the maintenance.

As illustrated in FIGS. 3 and 4, the autonomous management module 34 is mounted in an equipment compartment, or casing 36, integrated under the hubcap of the wheel (the wheel cover 38) at the center of rotation of the wheel and includes an access door or hatch 360 to allow in particular changing or recharging the battery 348. Preferably, this battery will be formed of several elements (for example 348A-348D) which will be judiciously distributed in the equipment compartment and will have preferably a mass of less than 200 g to avoid any unbalance and thus allow balancing of the wheel without having to add an additional member while being less sensitive to centripetal accelerations (conventionally on the order of 1,000 g for 30 s to 1,500 g for 3 s) than if these battery cells had been disposed at the pressure sensor.

It will be noted that although the description above refers to a single pressure sensor, it is clear that the invention also finds application to a pressure and temperature sensor also delivering the temperature of the tire.

Finally, the thermal environment in the wheel cover is more favorable than at the sensor, with the highest temperatures being up to 50° C. below. Thus, by placing part of the electronics in the wheel cover, the lifetime of this electronics is greatly improved.

The invention claimed is:

1. A system for monitoring an inflation pressure of tires of an aircraft comprising:
   a pressure sensor carried by each of a plurality of wheel rims of the aircraft and delivering an inflation pressure for each of the tires mounted on these rims, an energy autonomous management module including a battery and ensuring conversion of different tire inflation pressures into values used by a display device making the different tire inflation pressures available to a pilot or a maintenance operator, wherein the energy autonomous management module is distributed in each of a plurality of aircraft wheel covers and configured to communicate with the pressure sensor via a short-distance wireless communication link and to ensure a transmission of the tire inflation pressure coming from the pressure sensor towards the display device via a medium-range wireless communication link, and wherein the battery is rechargeable or non-rechargeable, and configured to provide a power supply to both the energy autonomous management module and the pressure sensor via the short-distance wireless communication link;

wherein the energy autonomous management module further includes
- a short-distance wireless communication unite associated with an antenna for receiving data coming from the pressure sensor,
- a processing unit for shaping said data,
- a medium-ran e wireless communication unite associated with an antenna for transferring a set of data thus collected to the display device.

2. The system according to claim 1, further including an intermediate module on-board the aircraft and through which the transmission of the inflation pressure is relayed to the display device via the medium-range wireless communication link.

3. The system according to claim 1, wherein the display device is a portable device or a device integrated into a cockpit of the aircraft.

4. The system according to claim 1, wherein the pressure sensor is a pressure and temperature sensor also delivering a temperature of the tire.

5. The system according to claim 1, wherein the pressure sensor includes a transducer for converting an internal pressure of the tire into an electrical signal, a processing unit for associating with this electrical signal a pressure data as well as at least one identifier data of the tire, and a short-distance wireless communication unite associated with an antenna for transferring these data to the energy autonomous management module.

6. The system according to claim 1, wherein the processing unit for shaping is configured to provide one or more surveillance information allowing fault detection.

7. The system according to claim 1, wherein the energy autonomous management module is mounted in an equipment compartment integrated under the wheel cover and including an access hatch to allow changing or recharging one or more battery cells.

8. The system according to claim 1, wherein the processing unit of the management module further includes a clock to ensure a time stamping of the data and is also configured to ensure encryption of the data.

9. The system according to claim 1, wherein the short-distance wireless communication takes place on a frequency comprised between 100 kHz and 150 kHz or in an NFC frequency band around 13 MHz and the medium-range wireless communication on the ISM band at 2.4 GHz or the WAIC band between 4.2 and 4.4 GHz according to a communication protocol conforming to the 802.15.4 standard.

10. The system according to claim 8, wherein the encryption is by a signature of AES 128.

* * * * *